United States Patent [19]
Katayama et al.

[11] Patent Number: 4,783,179
[45] Date of Patent: Nov. 8, 1988

[54] SEALING DEVICE FOR ROTARY FLUID MACHINE

[75] Inventors: Kazuso Katayama; Yasushi Mouri, both of Hiroshima, Japan

[73] Assignee: Mitsubishi-Jukogyo Kabushiki Kaisha, Japan

[21] Appl. No.: 99,710

[22] Filed: Sep. 22, 1987

Related U.S. Application Data

[63] Continuation of Ser. No. 839,363, Mar. 13, 1986, abandoned.

[51] Int. Cl.$^4$ ............................................. F16C 33/72
[52] U.S. Cl. ..................................... 384/130; 384/131; 384/309; 384/99
[58] Field of Search .................. 384/99, 308, 309, 152, 384/117, 220, 130, 131

[56] References Cited

U.S. PATENT DOCUMENTS

| | | | |
|---|---|---|---|
| 3,652,139 | 3/1972 | Memery | 384/99 |
| 3,836,215 | 9/1974 | Dopkin et al. | 384/99 |
| 4,580,911 | 4/1986 | Burkhard et al. | 384/309 |

*Primary Examiner*—Lenard A. Footland
*Attorney, Agent, or Firm*—McGlew and Tuttle

[57] ABSTRACT

The present invention is directed to a sealing device for a rotary fluid machine having bearings which are disposed at opposite end portions in a shaft chamber and support a shaft, the sealing device being characterized by comprising a fluid seal of a fluid having a higher pressure than in the shaft chamber, the fluid seal being provided at a portion in the shaft chamber through which the shaft extends; usual dynamic pressure type bearings disposed in the middle of the fluid sealing device itself or in the vicinity of the middle thereof, the bearings being further received in a housing of the sealing device; and sealing members for partially confining a space defined between the housing and the bearings in an axial direction and a peripheral direction in order to form a closed loop; whereby the bearings are pressed downward by a differential pressure between a pressure of the fed fluid and a pressure in the outside of the shaft chamber so as to permit increasing the number of kinetic fulcrums for the shaft and to thereby heighten a safe speed of the shaft. According to the above constitution of the present invention, the fluid fed into the sealing device can be utilized effectively, and it can be realized to provide the highly efficient and inexpensive high-speed rotary fluid machine.

3 Claims, 6 Drawing Sheets

SEALING DEVICE FOR ROTARY FLUID MACHINE

This application is a continuation of Ser. No. 06/839,363, filed 3-13-86, abandoned.

BACKGROUND OF THE INVENTION (i) Field of the Invention

The present invention relates to a sealing device for a rotary fluid machine capable of realizing a high-speed safe drive by utilizing an oil fed to the sealing device, introducing an assembly having an additional bearing function into the sealing device, and pressing the assembly downward by the force of hydraulic pressure in order to increase the number of kinetic fulcrums from 2 in the case of a conventional bearings to 4 and to thereby heighten a safe speed of the shaft.

(ii) Description of the Prior Art

The outline of a conventional sealing device will be described in reference to FIGS. 6 and 7.

The conventional rotary fluid machine such as a compressor, an air blower and a turbine has two bearings disposed opposite end portions in a shaft chamber, and in the case of the rotary fluid machine in which a rotary shaft is provided extending through the shaft chamber, it has intensively been required to drive a long thin rotary shaft at a high speed with the intention of improving a hydrodynamic efficiency.

However, when the long thin rotary shaft is supported by the opposite bearings alone and its driving is carried out, a safe speed of the shaft will deteriorate. If the rotary shaft is driven at a higher rotational frequency than the safe speed, an uncontrollable turning force will be generated by a fluid running in the shaft chamber and will bring about an unstable vibration in a rotary shaft system. This vibration will diffuse with time, so that a sealing state provided between the shaft chamber and the shaft will be damaged and an excessively strong contact will take place between rotary bodies and stationary portions and will break them. After all, the operation of the rotary fluid machine will be made impossible.

In order to prevent such an unwelcome phenomenon, i.e., in order to heighten the safe speed of the usual shaft, the latter has been thickened at the sacrifice of the hydrodynamic performance, and/or the number of the shaft chambers has been increased.

FIG. 6 is a sectional view illustrating a conventional centrifugal compressor entirely. Reference numeral 1 is a shaft chamber, numeral 2 is a rotary shaft, 3 is each of bearings disposed at the opposite end portions in the shaft chamber 1, and 4 is each seal.

In such a conventional sealing device as shown in FIG. 7, an atmospheric side seal ring 6 and an in-chamber side seal ring 7 are disposed in a housing 5, with these rings 6, 7 separated from the shaft 2 via a small space. This constitution prevents a high-pressure oil fed between both the seal rings 6, 7 from leaking out. Both the seal rings 6, 7 are adapted to freely slide on inner surfaces of the housing 5 which are perpendicular to an axis of the shaft 2, in compliance with the whirling of the shaft 2. Therefore, such an oil membrane seal has no reaction force to the whirling shaft.

SUMMARY OF THE INVENTION

An object of the present invention is to provide a highly efficient and inexpensive high-speed rotary fluid machine in which a fluid fed into a sealing device can be utilized effectively and a safe drive can be achieved.

The above mentioned object can be accomplished by a sealing device for a rotary fluid machine having bearings which are disposed at opposite end portions in a shaft chamber and support a shaft, the sealing device comprising a fluid seal of a fluid having a higher pressure than in the shaft chamber, the fluid seal being provided at a portion in the shaft chamber through which the shaft extends; usual dynamic pressure type bearings disposed in the middle of the fluid sealing device itself or in the vicinity of the middle thereof, the bearings being further received in a housing of the sealing device; and sealing members for partially confining a space defined between the housing and the bearings in an axial direction and a peripheral direction in order to form a closed loop; whereby the bearings are pressed downward by a differential pressure between a pressure of the fed fluid and a pressure in the outside of the shaft chamber so as to increase the number of kinetic fulcrums for the shaft and to thereby heighten a safe speed of the shaft.

In the present invention, when a sealing oil begins to be fed into a housing 4, a bearing housing 8 is pressed downward by a differential pressure between a pressure on the periphery thereof by the high-pressure sealing oil and a pressure in an oil discharge chamber 12 which is an atmospheric pressure due to the through-hole connecting to the atmosphere. In this case, an oil membrane is formed between the bearings 9 and the shaft 2. The above mentioned downward pressure is transmitted to the shaft 2 via the formed oil membrane. A sealing function is given by sealing rings, and thus they have the behavior of bearings kinetically, which fact permits a high-speed safe drive.

BRIEF DESCRIPTION OF THE DRAWINGS

FIGS. 1 to 5 are concerned with the present invention.

FIG. 1 is a sectional view illustrating the constitution of a bearing portion;

FIG. 2 is a sectional view taken along the line II—II in FIG. 1;

FIG. 3 is a view seen from the direction of an arrow E in FIG. 1;

FIG. 4b is a sectional view taken along the line IV—IV in FIG. 4a;

FIG. 5 is a sectional view of still another embodiment in which bearings are incorporated into a mechanical contact seal;

FIG. 6 is a sectional view illustrating a conventional example entirely; and

FIG. 7 is a sectional view of a sealing device of the device shown in FIG. 6.

DESCRIPTION OF THE PREFERRED EMBODIMENT

The present invention will be described in detail as an embodiment in reference to FIGS. 1 to 5.

Figure 1:
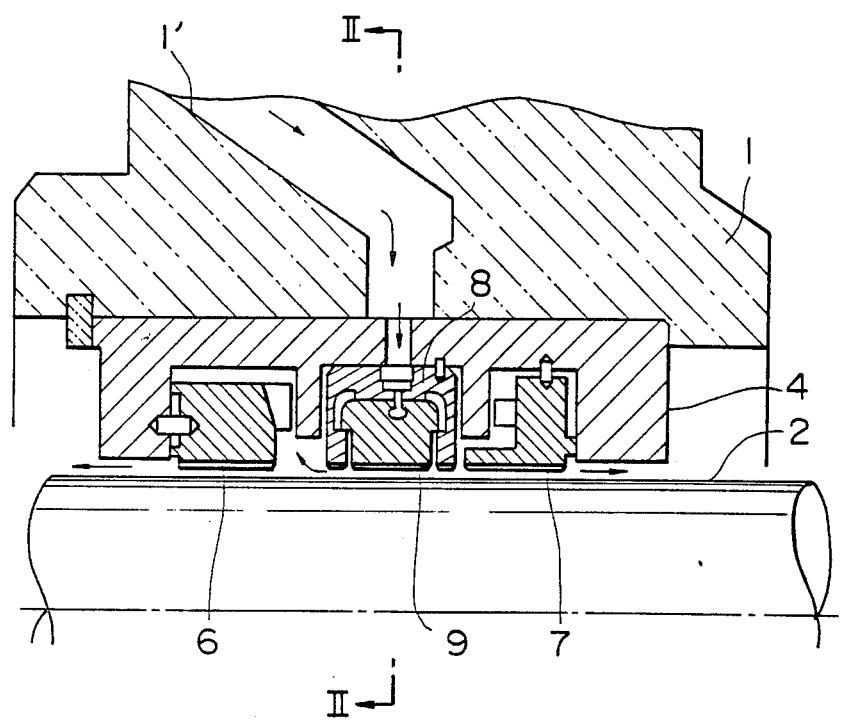

FIG. 1 shows a newly added bearing portion in the present invention.

In this drawing, reference numeral 1 is a shaft chamber, numeral 4 is a housing corresponding to a housing for a sealing device of a conventional technique and is disposed along a portion of the shaft chamber 1 through which a shaft 2 extends. Numerals 6 and 7 are oil membrane system seal rings having the same function as in the conventional case.

Figure 2:
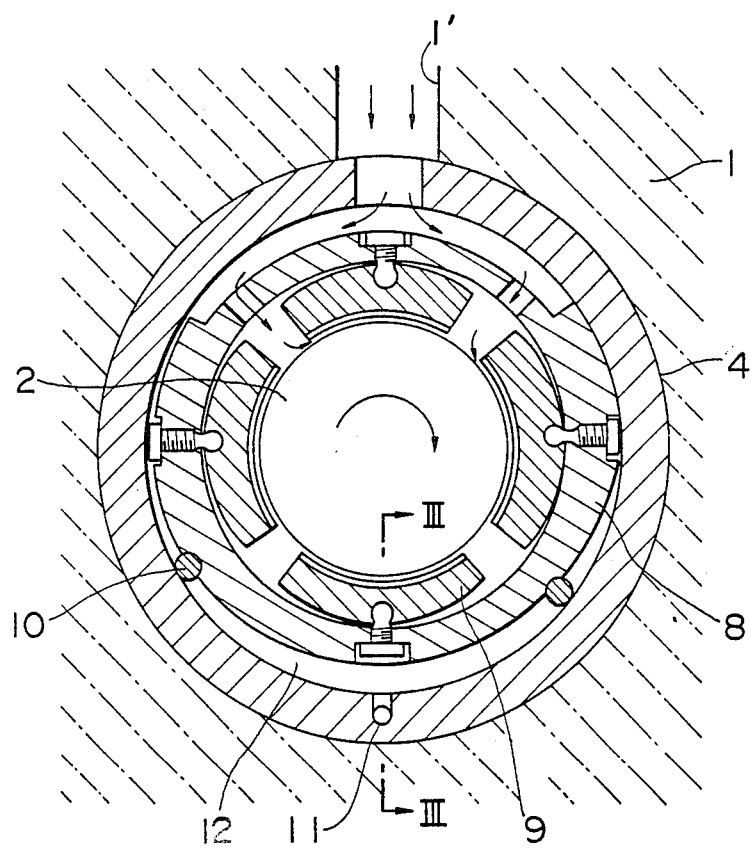

Numeral 8 is a bearing housing newly disposed in the present invention, and inside this housing 8, there are placed oil membrane bearings 9 usually used FIG. 2 is a sectional view taken along the line II—II in FIG. 1, and the respective numerals in the former drawing indicate the same parts as in the latter drawing. Reference numeral 10 represents each of extensible O-rings made from rubber or the like. Between the bearing housing 8 and the housing or seal ring housing 4, a clearance is retained so that the former 8 may be rotatable relatively to the latter 4. Numeral 11 is a through-hole formed in the housing 4 and is connected to the atmosphere.

Figure 3A:
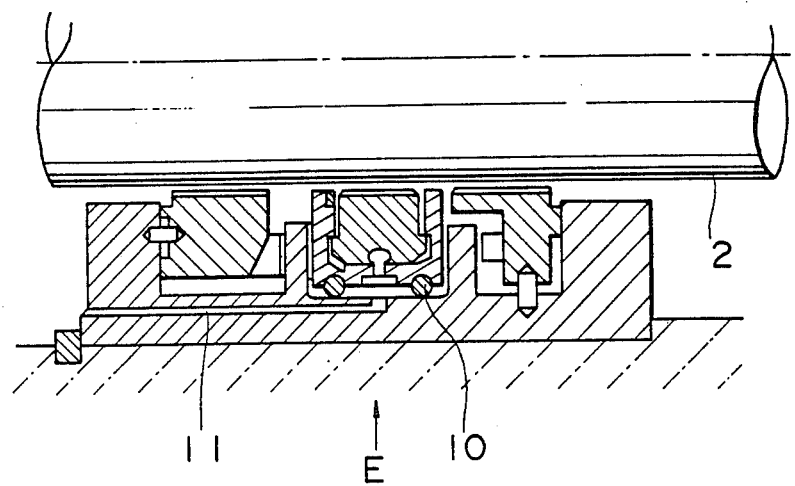
Figure 3B:
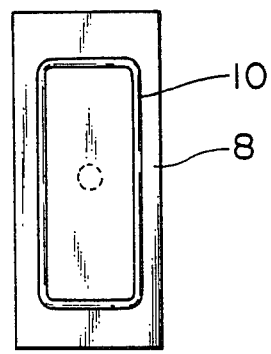

The detail of the above mentioned structure is shown in a section view of FIG. 1 which is taken along the line III—III in FIG. 2, and in FIG. 3 seen from the direction of an arrow E in FIG. 1. The O-rings 10 are disposed on an outer periphery of the bearing housing 8 exhibited in FIG. 2 so as to constitute a closed loop, as shown in FIGS. 1 and 3.

Now, reference will be made to the driving operation of the above mentioned sealing device. When the shaft 2 is rotated and a sealing high-pressure oil begins to be fed into a housing 4 through an oil feed opening or fluid pressure supply 1', the bearing housing 8 is pressed downward by a differential pressure between a pressure of the sealing oil on the periphery of bearing housing 8 formed in a first high pressure chamber and a pressure in an oil discharge chamber or second atmospheric pressure chamber 12 which is at atmospheric pressure due to the through-hole 11 connecting to the atmosphere. In this case, oil passes through fluid connections 50 and an oil membrane is formed between the bearings 9 and the shaft 2. The above mentioned downward pressure or fluid pressure actuation is transmitted to the shaft 2 via the formed oil membrane and the bearings 9 which are urged toward the shaft 2 by the fluid pressure. As best seen in FIG. 1, the high-pressure oil is fed into the housing 4 through the oil feed opening 1' lubricates the bearings 9 as the oil or fluid enters the interior of the bearing housing 8 through a fluid connection in the bearing housing 8, and acts on the atmospheric side seal ring or sealing member 6 and the in-chamber side seal ring or sealing member 7 which serve to prevent a gas in the chamber from leaking in a manner similar to a conventional concept.

The bearings 9 preferably are tilting pad type bearings, but any bearings are usable in the present invention, so long as they are dynamic pressure type radial bearings utilizing the usual oil membrane. In the case of using such bearings, the similar functional effect will be obtained.

Figure 4A:
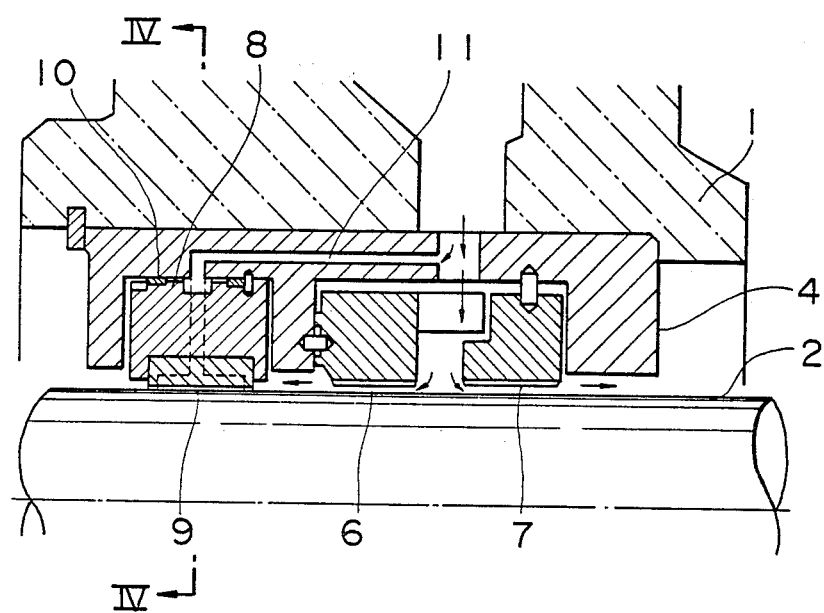
FIG. 4a is a sectional view of another embodiment.
Figure 4B:
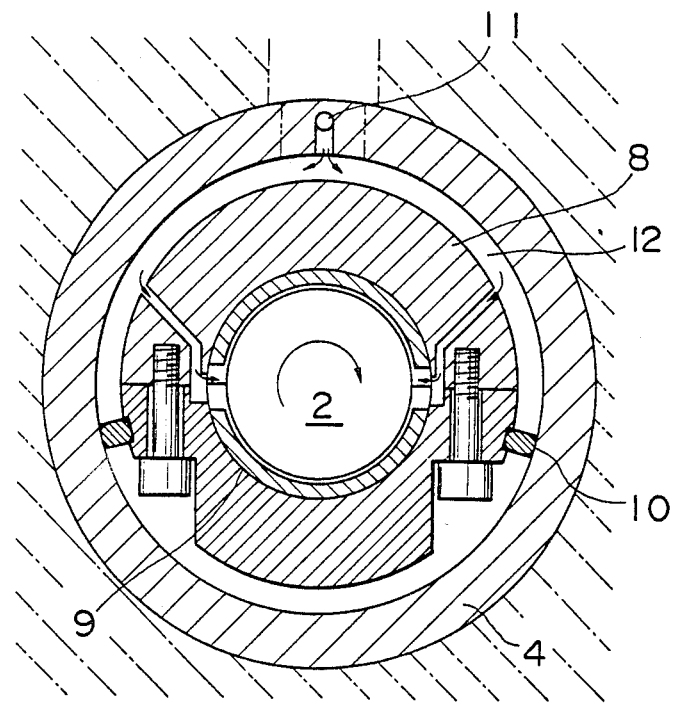
Figure 5:
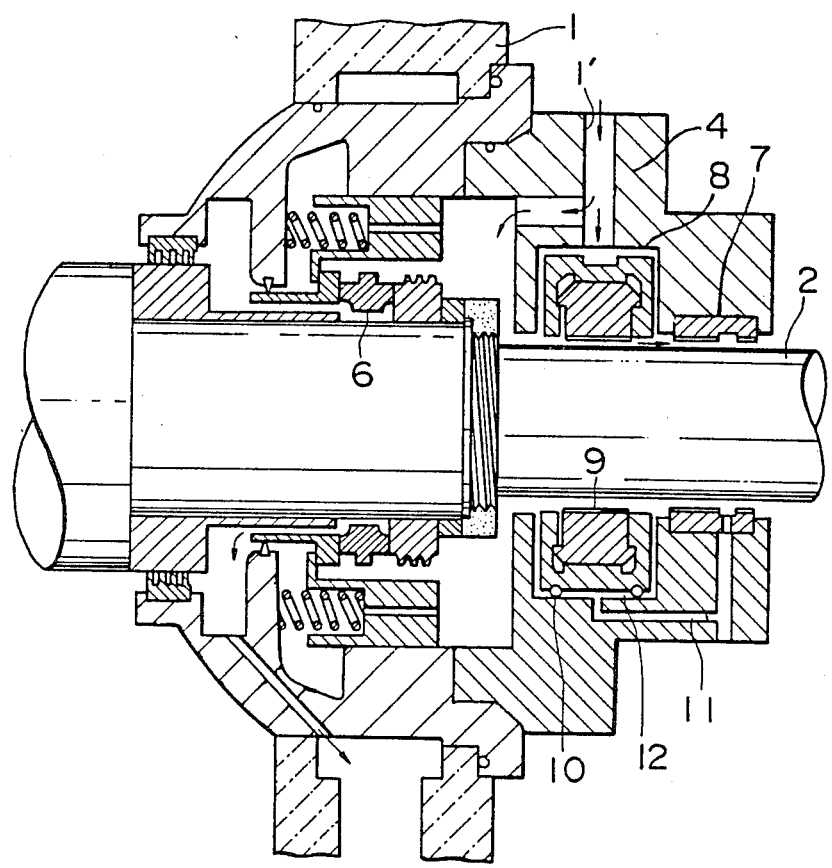

FIGS. 4a and 4b show another embodiment in which the same principle as mentioned above is employed. In this case, a bearing assembly (the housing 8 and the bearings 9) is disposed on the left side (on the atmospheric side) of the atmospheric side seal ring 6 in FIG. 4a, i.e., on the outside side of the sealing device itself.

Now, reference will be made to the constitution and the function of this embodiment. The high-pressure oil having the same function as the conventional one is fed to sealing sections of the seal rings 6, 7, and is partially introduced into the oil discharge chamber 12 through the through-hole 11. This oil discharge chamber 12 is a space portion defined by the bearing housing 8 and the housing 4, and a part of the space is confined by the O-rings 10 in its peripheral direction and axial direction. The space sealed by the O-rings 10 retains the oil pressure from underside, and thus the high-pressure oil in the oil discharge chamber 12 lubricates the bearings 9 and simultaneously functions to downwardly press the bearing assembly including the housing 8 and the bearings 9.

The space portion below the O-rings 11 is entirely connected to the atmosphere, and thus the high-pressure oil passes along the atmospheric side seal ring 6 and is finally discharged through the oil discharge chamber 12 as a waste oil.

Also in the case that the bearing assembly is disposed on the outside of the sealing device (on the left side of the seal ring 6 in FIG. 4a) in this way, the same functional effect as described above can be obtained.

Although the fluid membrane type sealing device has just been discussed above as one of the sealing devices, FIG. 5 shows another embodiment in which bearings are incorporated into a mechanical contact seal.

The principle of this embodiment is also identical to that described above. That is to say, the high-pressure oil fed into the housing 4 through the oil feed opening 1' lubricates the contact seal 6 and simultaneously resists an internal pressure in the shaft chamber 1 to seal the fluid in the shaft chamber 1. In addition, the bearings 9 are also lubricated by the fed high-pressure oil.

As described above, the oil discharge chamber 12 is defined between the bearing housing 8 for supporting the bearings 9 and the housing 4, and is confined in the lower portion thereof in its peripheral direction and axial direction by the O-rings 10 in order to form the closed loop. The oil discharge chamber 12 is connected to the atmosphere, and thus the chamber 12 has the atmospheric pressure therein. Under such a constitution, the bearing housing 8 is pressed downward together with the bearings 9 by a differential pressure between the pressure of the high-pressure oil and the atmospheric pressure The seal ring 7 controls the leakage of the oil toward the atmospheric side of the sealing device.

As is apparent from the foregoing, the mechanical contact seal in which the bearing assembly can also have the function of pressing the shaft 2 downward.

In the above embodiments, the high-pressure oil is used as the fluid for the sealing and the lubrication, and the atmosphere is utilized as the sealing fluid having the low pressure. However, it is also possible to make use of a sealing fluid other than the oil and to substitute another low-pressure fluid for the atmosphere, in applicable examples of the present invention.

Applying the principle of the present invention described above, it can easily be conceived that the bearings of the present invention are disposed only on either side in the shaft chamber 1 so as to provide three kinetic fulcrums.

According to the present invention, the bearings 9 are pressed together with the bearing housing 8 downward by the above mentioned function, and the sealing is carried out by the seal rings 6, 7. In consequence, the seal rings 6, 7 have the behavior of the hydrodynamic bearings for the shaft 2.

Figure 6:
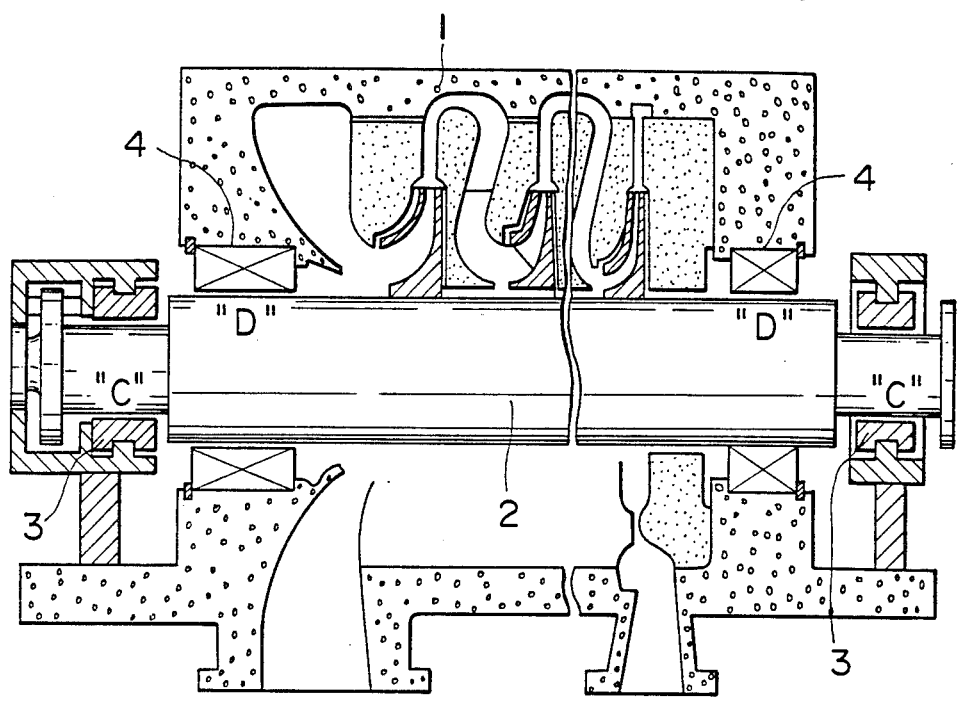
FIGS. 6 and 7 are in connection with a conventional technique.
Figure 7:
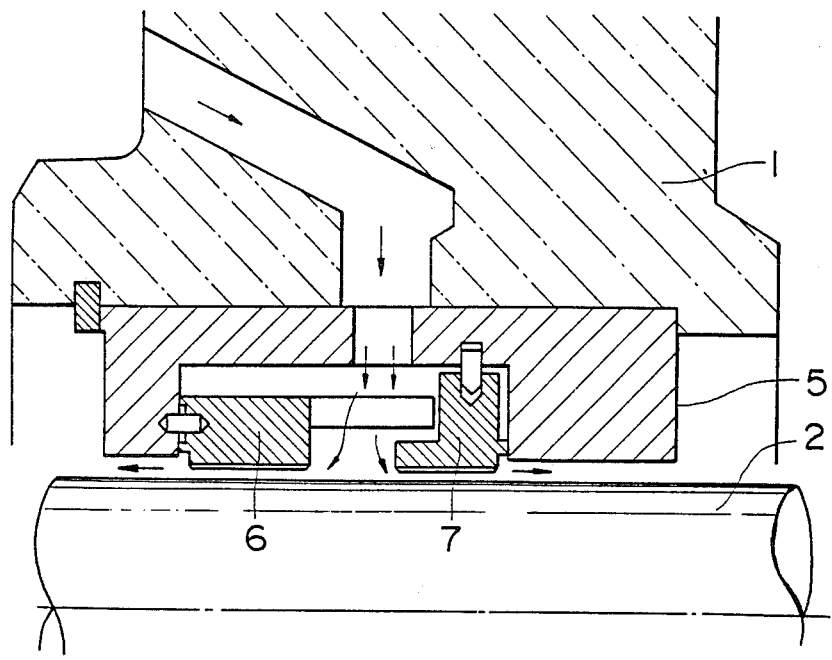

If such an assembly consisting of the bearing housing 8 and the bearings 9 is disposed in the housing 4 of the conventional rotary machine as shown in FIG. 6, the assembly in this rotary machine will hydrodynamically have the same effect as in the case where the bearings are placed at the four positions of "C", "D", "D" and "C" in FIG. 6.

In the constitution of the present invention, the rotary shaft has the four fulcrums hydrodynamically, and the safe speed of the shaft 2 can thus be much more heightened on the basis of the kinetic principle than the conventional one.

Therefore, the present invention permits the thus constituted rotary shaft to rotate at a higher speed than the conventional example In addition thereto, the function of the present invention can be utilized to allow the shaft to have a thinner and longer shape than the conventional one, because even if the shaft having such a shape is employed, the safe speed can be maintained at a high level and a high-speed safe driving is possible.

What is claimed is:

1. A sealing and bearing device for a rotary fluid machine, comprising:
    a shaft chamber housing having an inner surface defining a shaft chamber and having a shaft chamber housing fluid pressure supply passage conveying fluid under pressure to said shaft chamber;
    a shaft positioned within said housing and mounted for rotation on at least one bearing;
    a seal ring housing positioned within said shaft chamber housing defining a plurality of axially extending seal ring chambers extending around said shaft and open toward said shaft and a seal ring pressure supply passage formed in said housing wall conveying fluid under pressure from said shaft chamber housing fluid pressure supply passage to said plurality of axially extending seal ring chambers; at least one oil membrane seal ring freely slidably positioned within one of said plurality of axially extending seal ring chambers having a sealing face facing toward and spaced from said shaft;
    a bearing housing positioned within one of said plurality of axially extending seal ring chambers of said bearing housing and the interior of said one of said plurality of axially extending seal ring chambers forming a first high pressure chamber and a second atmospheric pressure chamber, said first high pressure chamber being in communication with said fluid under pressure in said one of said axially extending seal ring chambers, a through hole connection formed in said seal ring housing being in communication with said atmospheric pressure chamber and connected to atmosphere via said shaft chamber, an O-ring being positioned between said bearing housing and said one of said plurality of axially extending seal ring chambers separating said first high pressure chamber from said second atmospheric pressure chamber so that said bearing housing is urged toward said second atmospheric pressure chamber by a differential pressure, said bearing housing defining an axially extending bearing chamber extending around the periphery of said shaft and open toward said shaft, said bearing chamber being in fluid communication with said first high pressure chamber;
    a plurality of oil membrane bearing members each positioned within said bearing chamber connected to said bearing housing at radially spaced locations, each said oil membrane bearing member facing said shaft, oil passing into said bearing chamber forming an oil membrane between individual oil membrane bearing members and said shaft, the urging of said bearing chamber causing the transmission of downward pressure on said shaft through said individual oil membrane bearings.

2. A sealing and bearing device for a rotary fluid machine, comprising:
    a shaft chamber housing having an inner surface defining a shaft chamber and having a shaft chamber housing fluid pressure supply passage conveying fluid under pressure;
    a shaft positioned within said housing and mounted for rotation on at least one bearing;
    a seal ring housing positioned within said shaft chamber housing, said seal ring housing defining an axially extending seal ring chamber extending around said shaft and open toward said shaft, said seal ring housing having a seal ring pressure supply passage conveying fluid under pressure from said shaft chamber housing fluid pressure supply passage to said seal ring chamber;
    an oil membrane bearing housing positioned within said seal ring chamber, said bearing housing and the interior of said seal ring chamber forming a first high pressure chamber and a second atmospheric pressure chamber, said first high pressure chamber being in communication with said fluid under pressure in said axially extending seal ring chamber, a through hole connection formed in said seal ring housing being in communication with said atmospheric pressure chamber and connected to atmosphere via said shaft, a sealing member positioned between said bearing housing and said axially extending seal ring chamber separating said first high pressure chamber from said second atmospheric pressure chamber so said bearing housing is urged toward said second atmospheric pressure chamber by a differential pressure, said bearing housing an axially extending bearing chamber extending around the periphery of said shaft and open toward said shaft, said bearing chamber being in fluid communication with said first high pressure chamber;
    a plurality of oil membrane bearing members each positioned within said oil membrane bearing chamber connected to said oil membrane bearing housing at a radially spaced location, each said oil membrane bearing member facing said shaft, oil passing into said bearing chamber forming an oil membrane between individual oil membrane bearing members and said shaft, the urging of said bearing chamber causing the transmission of downward pressure on said shaft through said individual oil membrane bearings.

3. A sealing and bearing device according to claim 2, wherein: said fuel ring housing defining a plurality of axially extending seal ring chambers extending around said shaft, at least one oil membrane seal ring being freely slidably positioned within one of said plurality of axially extending seal ring chambers, said at least one oil membrane having a sealing face facing toward and spaced away from said shaft.

* * * * *